United States Patent [19]

Ellingson et al.

[11] Patent Number: 5,121,849

[45] Date of Patent: Jun. 16, 1992

[54] NUCLEAR WASTE STORAGE CANISTER AND COVER THEREFOR

[75] Inventors: Frederick J. Ellingson, Murrsville; P. Kent Shaver, Valencia, both of Pa.

[73] Assignee: U.S. Tool & Die, Inc., Pittsburgh, Pa.

[21] Appl. No.: 464,232

[22] Filed: Jan. 12, 1990

[51] Int. Cl.$^5$ .............................................. B65D 45/00
[52] U.S. Cl. ...................................... 220/248; 220/251
[58] Field of Search ............... 220/251, 315, 323, 233, 220/235, 243, 248; 138/89

[56] References Cited

U.S. PATENT DOCUMENTS

| 720,107 | 2/1903 | Brucker | 220/248 |
|---|---|---|---|
| 1,092,289 | 4/1914 | Reese | 220/248 X |
| 1,765,207 | 6/1930 | Coffee | 220/251 X |
| 1,847,117 | 3/1932 | Lantero | 220/323 X |
| 2,875,918 | 3/1959 | Baumier | 220/323 |
| 3,747,541 | 7/1973 | Reese | 109/50 |
| 4,007,849 | 2/1977 | Hinkle | 220/251 X |
| 4,077,840 | 3/1978 | Aubert | 176/87 |
| 4,166,537 | 9/1979 | Fortunato | 220/251 X |
| 4,339,098 | 7/1982 | Tardot et al. | 244/151 B |
| 4,461,597 | 7/1984 | Laurin | 404/25 |
| 4,693,278 | 9/1987 | Wilson et al. | 138/89 |
| 4,693,389 | 9/1987 | Kalen | 220/236 |
| 4,758,402 | 7/1988 | Schukei et al. | 376/205 |
| 4,806,098 | 2/1989 | Ramm et al. | 432/215 |

Primary Examiner—Stephen P. Garbe
Assistant Examiner—Nova Stucker
Attorney, Agent, or Firm—Clifford A. Poff

[57] ABSTRACT

A storage apparatus for storing nuclear waste material. The storage apparatus is comprised of an elongated storage canister suitable for the positioning of nuclear waste material, such as spent fuel rods, therewithin. A canister cover covers one end of the storage canister, and may be maintained in an interlocking relationship with a storage canister. The canister cover may be quickly engaged with a remotely operated handling tool, and because of the interlocking engagement with the storage canister, the handling tool may be utilized to handle and reposition the entire storage canister.

19 Claims, 4 Drawing Sheets

NUCLEAR WASTE STORAGE CANISTER AND COVER THEREFOR

BACKGROUND OF THE INVENTION

1. Field of the Invention

The present invention relates generally to apparatus for the storage and transport of nuclear waste material, and, more particularly, to a nuclear waste storage canister and a cover therefor.

2. Description of the Prior Art

A commercial nuclear facility generates electrical power by converting heat energy into electrical energy. The heat energy is generated as a byproduct of fission of a nuclear fuel source in which the fission process is permitted to occur at a controlled rate. In a commercial nuclear power facility, the nuclear fuel source is positioned underwater in a reactor core area of the facility. Nuclear fission is permitted to occur at a controlled rate by appropriate physical spacing of the nuclear fuel, and by positioning of nuclear moderators amongst the fuel. The water in the reactor core is permitted to circulate in a heat transfer relationship with the nuclear fuel source, thereby allowing the heat energy generated during the nuclear fission to be transferred to the coolant water. The heated coolant water is utilized to heat a secondary water system which, in turn, operates steam generators in order to produce electrical energy.

The nuclear fuel which fuels the fission process is, in most instances, positioned in fuel rods, of which a plurality thereof are positioned in the reactor core to generate the heat energy. The fuel rods are hollow metal pipes, having lengths of up to 16 feet, which are filled with the nuclear fuel. The fuel rods are supported by a supportive structure such that the fuel rods are maintained in precisely spaced arrays. The fuel rods, together with the supportive structure, are referred to as a nuclear fuel assembly. The reactor core areas of most commercial nuclear power facilities are of sizes to allow greater than one hundred fuel assemblies to be positioned therewithin at any time. The fuel assemblies are maintained underwater, and the water circulates among the fuel assembly in a heat transfer relationship. Such quantities of fuel assemblies suitably positioned in a reactor core create amounts of heat to allow generation of commercially useful amounts of electrical energy.

Over time, the heat energy generated by the nuclear fuel contained in the fuel rods of the fuel assemblies decreases. When the heat energy generation of the nuclear fuel falls beneath a predetermined level, replacement of the "spent" fuel material is necessitated. During such occasions, the entire fuel assemblies are removed from the reactor core, and are replaced with fuel assemblies having fuel rods containing fresh nuclear fuel material. However, the fuel assemblies removed from the reactor core still contain residual amounts of nuclear fuel material. These fuel assemblies, therefore, still possess significant heat generative properties.

In order to prevent overheating of the spent fuel assemblies subsequent to their removal from the reactor core, the spent nuclear fuel assemblies are stored in an underwater storage area; such underwater storage area is frequently referred to as a spent fuel pit. The heat generated by the spent fuel assemblies is dissipated by the water circulating through the spent fuel pit.

To most efficiently utilize the space of existing spent fuel pits, various methods and apparatus have been developed in order to consolidate, or otherwise allow, greater amounts of spent fuel and other nuclear waste material to be stored within a given area.

For example, several methods and apparatus have been disclosed in the prior art for removing the fuel rods of a fuel rod assembly, and reconfiguring the fuel rods into an array in which the spacing between adjacent fuel rods is minimized. The supportive structure of the fuel assembly may then be crushed, dismantled, or otherwise compacted. Such methods allow the storage capacity of a spent fuel pit to be approximately doubled.

Once removed from the fuel assembly and reconfigured into a compacted array, the spent fuel rods are positioned within storage canisters. The storage canisters are of dimensions allowing the fuel rods from one or more fuel assemblies to be stored therein. The compacted supportive structures of the fuel assemblies may similarly be stored in the storage canisters.

The size, shape, and weight of the storage canisters are determined by the lengths of the fuel rods to be stored therein. Typically, however, the waste canisters are between 13 and 16 feet in length, and have cross sectional dimensions of six to nine inches square. A storage canister containing the fuel rods of two fuel assemblies is of a weight (including the weight of the fuel rods) of up to 4,000 pounds.

The storage canisters are constructed such that water is permitted to circulate amongst the material stored therein. The coolant water must additionally be allowed to drain from the canister when the canister is lifted out of the storage pool. Such design requirements are met by constructing the canisters so that their bottom ends are open. Water is thereby allowed to circulate through the interior of the canister. The open ends additionally prevent pressure differentials between the interior and exterior of the canister.

The storage canisters are positioned in desired arrangements and numbers in a spent fuel pit. Apparatus has also been disclosed in the prior art in order to aid in the support and positioning of the storage canisters.

Handling of the storage canisters in order to allow for their positioning and repositioning in the spent fuel pit requires use of an overhead crane, or the like, having a canister handling tool affixed thereto. In order to facilitate such handling, the storage canister contains some type of connection device to facilitate connection with a canister handling tool. A canister cover is oftentimes attached to an end of the storage canister to allow connection to a handling tool. In order for the canister cover to accommodate the largest possible payload, the cover must be securely affixed to the canister, while still allowing coolant water to circulate among the material stored in the canister.

It is, accordingly, an object of the present invention to provide apparatus for the storage of nuclear waste material.

It is a further object of the present invention to provide a storage canister construction and a canister cover therefor for the storage of nuclear waste material.

SUMMARY OF THE PRESENT INVENTION

In accordance with the present invention, a storage apparatus for storing nuclear material is disclosed. The storage apparatus includes a storage canister having elongated sidewalls for allowing positioning of the nuclear material therewithin. The sidewalls preferably further include means for forming support walls.

The storage apparatus further includes a means forming a cover for covering at least one end of the storage canister. In the preferred embodiment of the present invention, the means forming a cover includes a top plate and a bottom plate, wherein the top plate and the bottom plate are spaced apart, and the top plate is of dimensions corresponding to a cross-section of the storage canister formed by the sidewalls such that the top plate may be positioned upon end portions of the sidewalls.

The apparatus also includes a means for affixing the means forming a cover to the sidewalls of the storage canister. In the preferred embodiment, the means for affixing engages with the means forming windows formed in the sidewalls of the storage canister. The means for affixing may, for example, be comprised of locking plates having dimensions allowing insertion thereof into the means forming support windows in order to provide interlocking engagement thereby.

The storage apparatus further includes a means for positioning the means for engaging at desired locations along the sidewalls. In the preferred embodiment of the present invention, the means for positioning is comprised of a retainer plate threadedly coupled to a threaded shaft member positioned to extend between the top and bottom plates, respectively, of the canister cover, wherein the retainer plates supports the locking plates forming the means for engaging therefrom. Preferably, rotation of the threaded shaft member about a vertical axis thereof causes vertical translation of the retainer plate between the top and bottom plates, respectively, of the canister cover. Rotation of the threaded shaft member can, thereby, position the retainer plate in an interlocking position whereat the locking plates are positioned in either an interlocking relation with the means forming support windows of the sidewalls of the storage canister, or, in a non-interlocking position whereat the locking plates are positioned in a non-interlocking relation with the sidewalls of the storage canister. The storage apparatus may further include hinge members hingedly connecting the retainer plate and the locking plates such that the locking plates are rotated into the interlocking relation or into the non-interlocking relation with the sidewalls of the storage canister responsive to vertical translation of the retainer plate.

The storage apparatus further includes means connecting the means forming a cover with external manipulating tools. The means for connecting may, for example, include a support ring affixed to the threaded shaft member and supported to extend above a top surface of the top plate of the canister cover, wherein the support ring facilitates rotation of the threaded shaft member by an external manipulating tool, and provide a connecting element for facilitating lifting of the canister cover and the storage canister when interlocked therewith.

Further, according to the teachings of the present invention, a canister cover for facilitating lifting, by manipulator tool, of a nuclear waste storage canister formed of elongated sidewalls having support windows extending therethrough is disclosed. The canister cover includes means for forming a plate supported upon end portions of the sidewalls of the storage canister, means for affixing the means for forming a plate to the support windows of the elongated sidewalls of the storage canister for interlocking engagement therewith, means for positioning the means for affixing at desired elevations to allow the interlocking engagement of the means for affixing to the sidewalls to the support windows of the elongated sidewalls, and means for connecting the means for forming a plate to a manipulating tool. The means for forming a plate preferably includes a top plate and a bottom plate wherein the top plate and the bottom plate are spaced apart, and the top plate is of dimensions corresponding to a cross section of he nuclear waste storage canister formed by the sidewalls such that the top plate may be positioned upon end portions of the sidewalls.

In the preferred embodiment, the means for affixing includes locking plates for positioning through the means forming support windows for interlocking engagement thereby. The means for positioning preferably includes a retainer plate threadedly coupled to a threaded shaft member positioned to extend between the top and bottom plates, respectively, of the canister cover, such that the retainer plate supports the locking plates therefrom. Hinge members preferably connect the locking plates to the retainer plate. Rotation of the threaded shaft member about a vertical axis thereof causes vertical translation of the retainer plate between the top and bottom plates, respectively, of the canister cover wherein rotation of the threaded shaft member positions the retainer plate in an interlocking position whereat the locking plates are positioned in either an interlocking relation with the means forming support windows or in a non-interlocking position whereat the locking plates are positioned in a non-interlocking relation with the sidewalls of the storage canister. Hinge members may be included for hingedly connecting the retainer plate and the locking plates such that the locking plates are rotated into the interlocking relation or into the non-interlocking relation with the sidewalls of the storage canister responsive to vertical translation of the retainer plate. In the preferred embodiment, the means for connecting includes a support ring affixed to the threaded shaft member and supported to extend above a top surface of the top plate of the canister cover.

BRIEF DESCRIPTION OF THE DRAWINGS

The present invention will be better understood when read in connection with the accompanying drawings in which.

DESCRIPTION OF THE PREFERRED EMBODIMENTS

Figure 1:
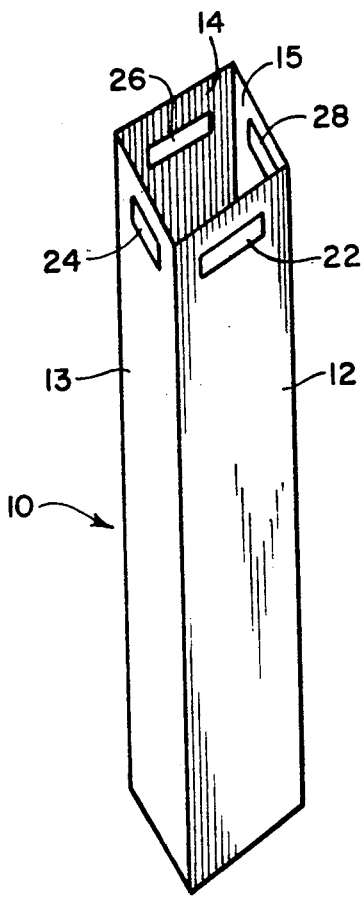
FIG. 1 is a schematic illustration of a storage canister forming a portion of the present invention.

Referring first now to the schematic illustration of FIG. 1, there is shown a single storage canister 10 comprising a portion of the present invention. The storage canister 10 is comprised of sidewalls 12, 13, 14, and 15. The sidewalls 12-15 are configured such that the canister 10 is of a square cross-sectional area. Other geometric arrangements are, of course, similarly possible. Formed to extend through the sidewalls 12-15 at portions proximate to end 16 are support windows 22, 24, 26, and 28, respectively. The sidewalls of the canister 10 form an enclosed area suitable for the placement therein of nuclear waste material, and, in particular, for the placement therewithin of nuclear fuel rods. As mentioned previously, compaction methods and apparatus are known in the art for consolidating and compacting nuclear waste material and for storing the nuclear waste material in a storage canister such as storage canister 10. In order to allow the storage of spent nuclear fuel rods in the canister 10, the canister 10 is of a length substantially corresponding to the length of the nuclear fuel rods, which are typically thirteen to sixteen fifteen feet in length. Canister 10 is preferably comprised of stainless steel, or some other high-strength, corrosion-resistant material.

Figure 2:
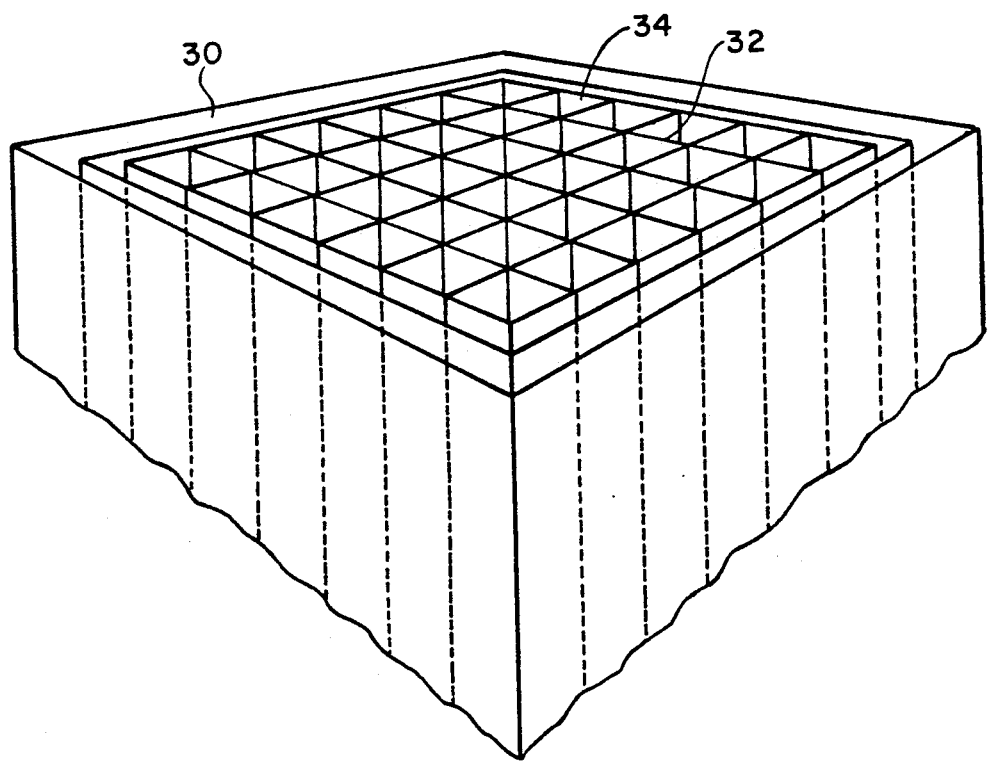
FIG. 2 is a cut-away, schematic view of a rack assembly positioned in a spent fuel pit for supporting storage canisters therein.

Turning now to the cut-away view of FIG. 2, there is shown a portion of a typical spent fuel pit 30 and support structure 32 suitable for the support of storage canisters 10 during storage thereof in the spent fuel pit. Support structure 32 is preferably a rack assembly comprised of numerous elongated tubes affixed along lengthwise dimensions thereof to form an array of racks 34. Storage canisters 10 are positioned in selected ones of the racks 34 of the support structure 32. Pit 30 is typically a concrete, pool-like construction suitable for holding water, with load characteristics allowing the weight of the coolant water, support structure 32, and a desired number of waste-containing storage canisters to be supported therein.

Figure 3:
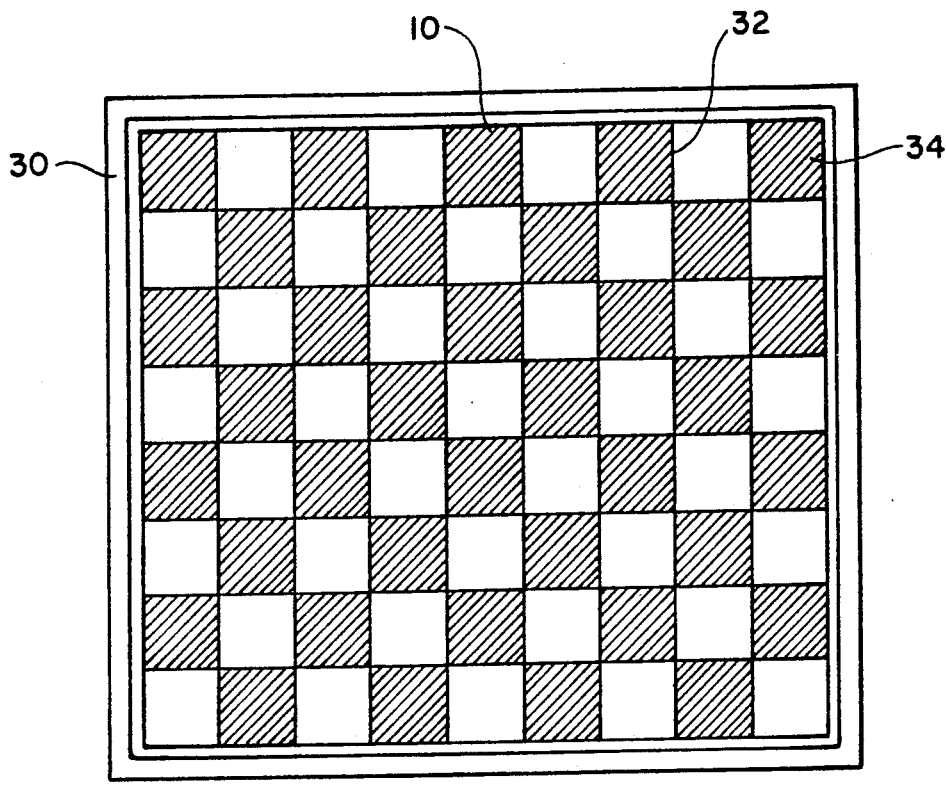
FIG. 3 is a plan view of the rack assembly of FIG. 2 illustrating a typical storage arrangement in a spent fuel pit in which storage canisters are positioned in alternating racks of the support structure.

Illustrated in the plan view of FIG. 3, there is shown a typical arrangement of storage canisters 10 in selected racks 34 of the structure 32. The particular arrangement, and, hence, the density of the nuclear waste material stored in the spent fuel pit 30 is determined by the residual heat generation of the waste material stored in the individual canisters 10. Illustrated in FIG. 3, nuclear waste-containing storage canisters 10 are positioned in alternating racks 34 of the support structure 32 to form a checkerboard-like array. Over time, as the residual heat generation of the waste material stored in the individual canisters 10 decreases, the storage canisters 10 may be repositioned such that every rack 34 of the support structure 32 is utilized to store nuclear waste material. The entire support structure 32 and the storage canisters 10 stored in individual ones of the racks 34 are maintained under water in a heat transfer relationship with the nuclear waste material stored in individual ones of the canisters 10. Because an end portion 16 of each canister 10 is open, water is permitted to circular among the nuclear waste material stored in the canisters 10.

Remotely operated handling tools are frequently utilized to lift and lower the storage canisters 10 in order to reposition the storage canisters 10 in the support structure 32. It is accordingly one purpose of the present invention to provide the storage canisters 10 with means to facilitate their engagement with the handling tools to allow the repositioning of the canisters 10 in the spent fuel pit.

Figure 4:
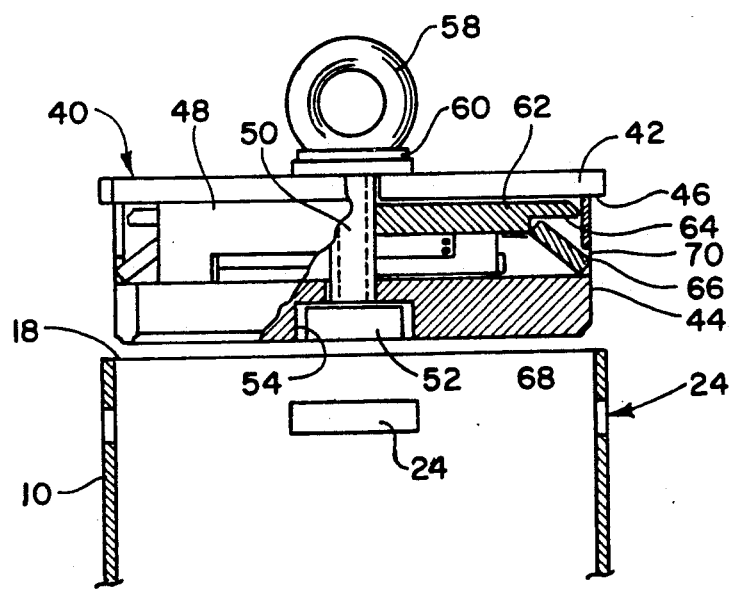
FIG. 4 is a sectional view of the storage canister cover forming a portion of the present invention.

Turning now to the sectional view of FIG. 4, there is shown the canister cover, referred to generally by reference numeral 40, forming a portion of the present invention. Canister cover 40 is of dimensions allowing the placement thereof upon an end portion 18 of storage canister 10. Canister cover 40 includes top plate 42 and bottom plate 44. Bottom plate 44 is of dimensions less than the internal diameter of the storage canister 10, and top plate 42 is of dimensions such that a bottom outer perimeter 46 thereof rests upon the ends of sidewalls 12-15 of the canister 10. Bottom plate 44 is maintained at a predetermined distance from top plate 42 by sidewalls 48 formed to extend about a perimeter of the cover 40. Threaded shaft member 50 is positioned to extend between top plate 42 and the bottom plate 44, preferably at the center portions thereof. Bar member 52 is affixed to a bottom end of shaft member 50, and, in the preferred embodiment, bottom plate 44 contains an indentation 54 forming support surface 56 to allow supportive engagement of bottom plate 44 upon bar 52. Affixed to a top end of shaft member 50 is support ring 58 which extends above a top surface of top plate 42. Because both bar 52 and support ring 58 are affixed to shaft 50, rotation of ring 58 causes rotation of both shaft 50 and bar 52. Ring member 60 is supported upon a top surface of plate 42, and is utilized both to support ring 58 and to reduce frictional engagement during rotation of ring 58.

Positioned between top plate 42 and bottom plate 44, and threadedly engaged with shaft member 50 is retainer plate 62. Retainer plate 62 is of dimensions allowing the positioning thereof within the interior chamber formed by canister 10 and is preferably of widthwise and lengthwise dimensions such that side portions of plate 62 abuts against sidewalls 48. In such an arrangement, because plate 62 is prohibited from rotation due to the abutment against sidewalls 48, rotation of threaded shaft member 50 causes vertical translation of the retainer plate 62 between the top plate 42 and bottom plate 44.

Opposite edge portions of the bottom surface of the retainer plate 62 form support surfaces 64. Locking bars 66 are hingedly coupled to the bottom surface of retainer plate 62 by hinge members 68. Locking bars 66 are of dimensions allowing for their insertion into apertures 70 formed in the sidewalls 48 of the canister cover 40, and into the support windows 24 formed in the sidewalls of the storage canisters 10. Hinge member 68 may, for example, the comprised of a thin, sheet metal strip which is spot welded to the bottom surfaces of both retainer plate 62 and the respective locking plates 66.

Figure 5:
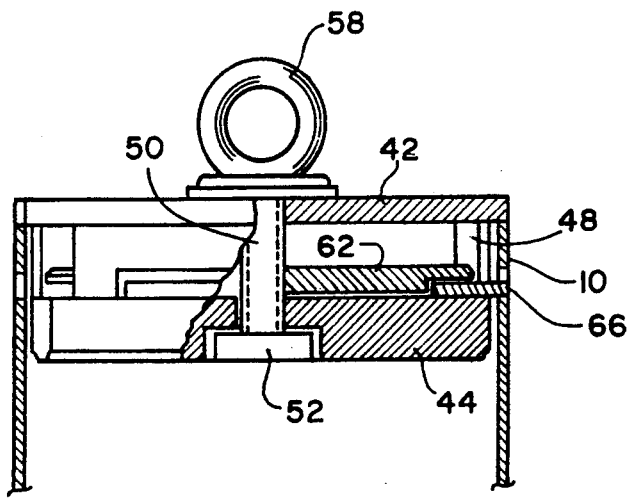
FIG. 5 is a sectional view of the canister cover similar to that of FIG. 4, but illustrating the connection between the canister cover and the sidewalls of the storage canister.

The sectional view of FIG. 5 is similar to the illustration of FIG. 4, but illustrates the canister cover 40 positioned in an interlocking relationship with the storage canister 10. FIG. 5 illustrates the interlocking supportive engagement between the locking plates 66 and the support windows 24 formed to extend through the sidewalls of storage canister 10. It is to be noted that, in the preferred embodiment, support windows 24 are formed to extend through each of the four sidewalls 12-15 of the storage canister 10, and retainer plate 62 supports four locking plates 66 corresponding in number and position with the support windows 24. It is to be noted, however, that greater or fewer numbers of locking plates and support windows 24 may be utilized by the storage apparatus of the present invention. When locking plates 66 are positioned to maintain an interlocking engagement with the support windows 24 of the canister 10, a remote handling tool may be utilized to engage with support ring 58 in order to handle and reposition the storage canister 10 to which canister cover 40 is engaged. By merely rotating the threaded shaft member 50, such as, for example by applying a rotational torque to support ring 58 through the handling tool, the retainer plate 62 is translated in the vertical direction in order to position the locking plates 66 in either interlocking engagement with support windows 24, or position the locking plates 66 in a non-interlocking engagement with the storage canister 10. When locking plates 66 are positioned to maintain interlocking engagement with the support windows 24 of the storage canister 10, each of the locking plates 66 is maintained in a confronting face-to-face engagement with both support surface 64 of retainer plate 62, and the top surface of bottom plate 44. Upward or downward force applied to support ring 58 by a remotely operated handling tool causes a corresponding translation of the storage canister 10 affixed to the storage canister 40.

Figure 6:
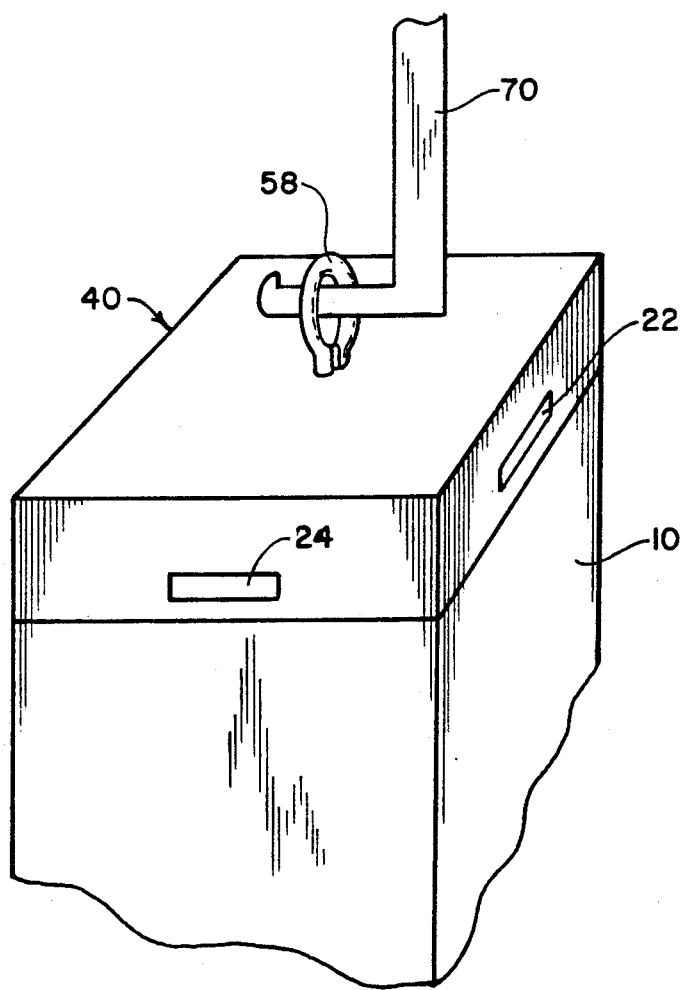
FIG. 6 is a schematic view of a portion of the storage apparatus of the present invention illustrating the connection between the storage apparatus and an external manipulator.

FIG. 6 is a schematic illustration of a canister cover 40 positioned to cover an end 18 of storage canister 10. An end portion 70 of a remotely operated handling tool is engaged with support ring 58 to allow handling of the storage canister 10. Handling tool 70 may be utilized to position the storage canister 10 in a desired rack 34 of support structure 32 illustrated in FIGS. 2 and 3.

Figure 7:
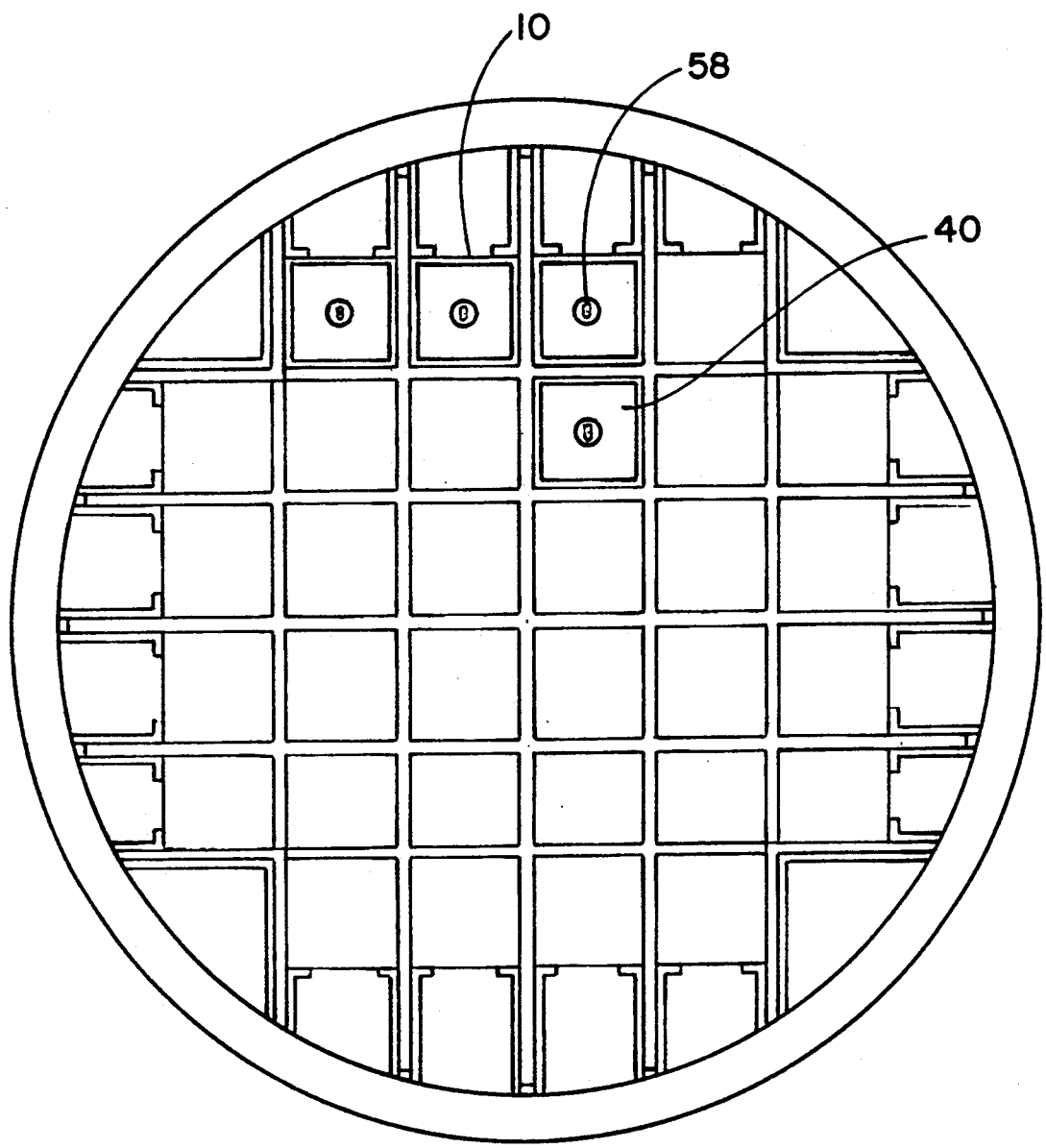
FIG. 7 is an end view of the storage canister and canister cover of the present invention positioned in a cask basket construction to allow transport of the storage canister.

Additionally, and as illustrated in the end view of FIG. 7, when the canister cover 40 is maintained in interlocking engagement with the storage canister 10, the remotely operated handling tool 70 may be utilized to position the storage canister 10 in apparatus allowing the storage canister 10 to be transported to a remote location. FIG. 7 illustrates several storage canisters positioned within a cask basket structure 74 which may be utilized to transport nuclear waste material over commercial channels. Because the entire storage canister 10 may be lifted by merely engaging the remotely operated handling tool 70 with the support ring 58 of the canister cover 40, handling of the storage canister 10 is greatly facilitated.

Because the canister cover can be constructed by punching and shearing operations, and because close tolerance machining operations are not required, construction costs are minimized. Additionally, because the canister cover is comprised of relatively few moving parts, reliable and secure use thereof is facilitated.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims

We claim:

1. A storage apparatus for storing nuclear material, said apparatus including:
   a storage canister having a major axis and having elongated sidewalls for allowing positioning of the nuclear material there within,
   said sidewalls having support windows formed therein,
   means defining a cover for covering at least one end of said storage canister, said means defining a cover having a central axis, said major axis of said storage canister and the central axis of said means defining a cover being co-planar;
   means for affixing said means defining a cover into said windows of said sidewalls of the storage canister;
   force applying means for moving said means for affixing in the direction co-axially of said major axis and, said central axis for affixing said means for affixing at desired location of the sidewalls of the storage canister, and
   means for connecting said force applying means with external manipulating tool means.

2. The storage apparatus of claim 1 wherein said means for affixing extend into said support windows.

3. The storage apparatus of claim 2 wherein said means for affixing includes locking plates having dimensions for allowing insertion thereof through said support windows.

4. The storage apparatus of claim 3 wherein said means for affixing includes a retainer plate threadedly coupled to a threaded shaft member positioned to extend between top and bottom plates, respectively, of the canister cover, wherein said retainer plate supports the locking plates therefrom.

5. The storage apparatus of claim 4 wherein rotation of said threaded shaft member about a vertical axis thereof causes vertical translation of the retainer plate between the top and bottom plates, respectively, of said cover.

6. The storage apparatus of claim 5 wherein said rotation of the threaded shaft member positions the retainer plate in an interlocking position whereat said locking plates are positioned in either an interlocking relation with said windows of the sidewalls of the storage canister, or in a non-interlocking position whereat said locking plates are positioned in a non-interlocking relation with said sidewalls of the storage canister.

7. The storage apparatus of claim 6 further including hinge members hingedly connecting said retainer plate and said locking plates such that said locking plates are rotated into said interlocking relation or into said non-interlocking relation with the sidewalls of the storage canister responsive to axial translation of the retainer plate.

8. The storage apparatus of claim 7 wherein said means for affixing includes a support ring affixed to the threaded shaft member and supported to extend above a top surface of the top plate of said cover, said support ring facilitating rotation of said threaded shaft member by an external manipulating tool, and providing a connecting element for facilitating lifting of said cover and the storage canister when interlocked therewith.

9. A storage apparatus for storing nuclear material, said storage apparatus including:
   a storage canister having elongated sidewalls for allowing positioning of the nuclear material therewithin;
   support windows through each of the elongated sidewalls defining supportive engagement surfaces thereby;
   a storage canister cover comprising a top plate and a bottom plate, said top and bottom plates being separated by a predetermined spacing;

a threaded shaft member positioned to extend between the top and bottom plates, respectively, of the canister cover;

a retainer plate threadedly engaged with said threaded shaft member, wherein rotation of the threaded shaft member causes translation of the retainer plate between the top plate and the bottom plate of the canister cover;

locking plates hingedly coupled to the retainer plate, said locking plates having dimensions allowing insertion into the support windows formed to extend through the sidewalls of the storage canister such that translation of said retainer plate causes said locking plates to be positioned in either an interlocking relation with said support windows or in a non-interlocking relation with said support windows; and a support ring affixed to said threaded shaft member and supported to extend above a top surface of the top plate of the canister cover.

10. A canister cover for facilitating lifting, by a manipulator tool, of a nuclear waste storage canister formed of elongated sidewalls having support windows extending therethrough, the axis of said canister and canister cover being co-planar, said canister cover including:

means defining a plate supported upon end portions of said sidewalls of the storage canister;

means for affixing the means defining a plate to the support windows of the sidewalls for interlocking engagement therewith;

force applying means for moving said means for affixing in the direction co-axially of said axis for affixing said means for affixing at desired elevations to allow said interlocking engagement of the means for affixing to the sidewalls, and means for connecting said force applying means to the manipulator tool.

11. The canister cover of claim 10 wherein said means defining a plate includes a top plate and a bottom plate, said top and bottom plates, respectively, being spaced apart with said top plate having dimensions corresponding to a cross section of the storage canister formed by said sidewalls such that said top plate may be positioned upon said end portions of the sidewalls.

12. The canister cover of claim 11 wherein said means for affixing includes locking plates having dimensions for allowing insertion thereof through said support windows.

13. The canister cover of claim 12 wherein said means for affixing includes a retainer plate threadedly coupled to a threaded shaft member positioned to extend between said top plate and said bottom plate, respectively, wherein said retainer plate supports the locking plates therefrom.

14. The canister cover of claim 13 wherein rotation of said threaded shaft member about a vertical axis thereof causes vertical translation of the retainer plate between said top and bottom plates, respectively.

15. The canister cover of claim 14 further including hinge members hingedly connecting the retainer plate and the locking plates.

16. The canister cover of claim 15 wherein said rotation of the threaded shaft member positions the retainer plate in an interlocking position whereat said locking plates are rotatably positioned in either an interlocking relation with said sidewalls, or in a non-interlocking position whereat the locking plates are rotatably positioned in a non-interlocking relation with the sidewalls of the storage canister.

17. The canister cove of claim 15 further including hinge members hingedly connecting the retainer plate and the locking plates such that said locking plates are rotated into said interlocking relation or into said non-interlocking relation with the sidewalls of the storage canister responsive to vertical translation of the retainer plate.

18. The storage apparatus of claim 3 wherein said means for affixing includes a retainer plate operatively connected to a shaft means positioned to extend between top and bottom plates, of the canister cover, wherein said retainer plate supports the locking plates therefrom.

19. The storage apparatus of claim 1 wherein said means for affixing includes a locking plate means, said locking plate means including means for allowing movement thereof in the direction of said central axis, and means for connecting sad locking plate means to said force applying means.

* * * * *